United States Patent Office 3,637,570
Patented Jan. 25, 1972

---

3,637,570
PROCESS FOR PRODUCING PROTECTIVE COATING OF SILOXANE RESIN AND PRODUCT PRODUCED
Robert L. Stout, Dayton, Ohio, assignor to the United States of America as represented by the Secretary of the Air Force
No Drawing. Filed Feb. 25, 1969, Ser. No. 802,249
Int. Cl. C08g 51/28
U.S. Cl. 260—33.6 SB                    9 Claims

ABSTRACT OF THE DISCLOSURE

The process described herein comprises the mixing of a siloxane prepolymer having repeating units of the formula

with 3-25 parts per 100 of prepolymer of a curing agent comprising an amino-alkyl-alkoxyl-silane having the formula

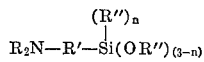

wherein R is selected from the group consisting of hydrogen, alkyl, cycloalkyl and amino-alkyl radicals; R' is a divalent hydrocarbon radical having at least three carbon atoms and having the valence bonds which are attached to the N and Si of the formula separated by at least three carbon atoms; R'' is a monovalent hydrocarbon radical having one to six carbon atoms; and $n$ is an integer having a value of 0-2. These components are mixed in an inert solvent such as xylene or toluene in a proportion so as to produce a solution of approximately 50-60 percent by weight solids, allowing the components to react in solution for a period of 30-60 minutes, thereafter applying the solution as a coating on a solid substrate, and curing the applied film by air-drying at a temperature of about 20-40° C. The coating cures in a relatively short time, even without modifiers and without heating, to a film capable of withstanding temperatures of 650° F. for extended periods.

---

The invention described herein may be manufactured and used by or for the United States Government for governmental purposes without payment to me of any royalty thereon.

BACKGROUND OF THE INVENTION

Field of the invention

The present invention relates to a method of preparing a protective coating of polymeric siloxane without the addition of organic modifiers or the application of heat to produce a coating capable of withstanding extremely high temperatures for extended periods.

Description of the prior art

Unmodified siloxane resins have long been recognized for their thermal stability and resistance to high temperatures. For that reason, they have been widely used as protective films or coatings in a variety of applications. When modified with various organic resins, the siloxane resins perform satisfactorily up to 650° F. for only short periods of time. However, extended exposure to this temperature destroys the organic portion of the coating, and results in film failures. Therefore such modifications are usually limited to about 450° F. to avoid discoloration, peeling and blistering. Unmodified polysiloxanes pigmented with aluminum powder have withstood extremely high temperatures but have required high temperatures (exceeding 450° F.) for curing.

The achievement of supersonic speeds by aircraft and space vehicles and the aerodynamic heating, as high as 650° F. and higher, resulting from friction of these vehicles passing through the atmosphere have created a demand for polysiloxane coatings capable of with standing high temperatures as well as performing other functions such as radiation absorption, surface emittance, reflectance and the like. On large and complex shapes of space vehicles and aircraft where such polysiloxane coatings are desired, they are not feasible because they require costly heat curing processes and facilities. For example, the curing time of all presently known unmodified polysiloxane films is approximately 30 minutes at 480° F. While this time-temperature combination can be varied, by shortening the time and increasing the temperature or vice versa, heat curing facilities are nevertheless required in all such cases. However, hot air ovens of a size capable of accommodating large aircraft or space vehicles are impractical. For these reasons, unmodified siloxane coatings for such purposes have not been considered feasible in spite of the well-known heat-protective capabilities of this material.

While it has been possible to apply polysiloxane coatings and to cure the same on smaller components, which may thereafter be assembled into larger units, such processes have been expensive, have involved discontinuities in the surfaces of the final assembly, and the coatings are subject to damage in the process of handling and assembling. In some attempts to solve the difficulties, resort has been made to modifying the polysiloxanes with substantial proportions of organic resins, such as alkyd resins. Such modified polysiloxane resins can be relatively easily applied to large objects and air-dried to provide durable and adherent coatings. While such modified coatings have been satisfactory in many instances, and can be made to achieve many desirable characteristics, they are not capable of the prolonged heat resistance or thermal stability shown by the "pure" or unmodified polysiloxane films.

Although various types of polysiloxane resins have been disclosed in the prior art, and various methods of preparing, applying and curing the same have been disclosed, no prior art has been found as to the method of preparing, applying and *air-drying* polysiloxane resins to a protective coating capable of withstanding temperatures of 650° F. or more.

Keil Pat. No. 3,249,535 discloses the preparation of a copolymer prepared by reacting a polymeric dimethylsiloxane having hydroxy terminal groups with an organic acid derivative of an aminoalkyl-siloxane monomer. Although the reaction is indicated as proceeding at room temperature or upon heating the presence of the acid component apparently prevents polymerization from proceeding to a cured state, since the product is indicated as being soluble in diesel fuel. The resultant solution is fed into oil lines to prevent paraffin deposition. Reference is also made to coating the oil conduit or container with this material. There is no indication in this patent that a material was obtained which was capable of being air-dried or cured to a protective coating capable of withstanding high temperatures as described above.

Other prior art references show the use of aminoalkyl silanes as catalysts to promote the polymerization of monomeric silanes, such as hydrolyzed dimethyldichlorosilane or diphenyldichlorosilane, methyltrichlorosilane, phenyltrichlorosilane, and the like such as described in Sellers' Pat. No. 3,068,199. However, in these cases, the amino compound acts as a catalyst in promoting the reaction of the monomeric siloxane. The types of products obtained are not indicated as being suitable for protective coatings that would cure at room temperature to give cured insoluble coatings capable of withstanding high temperatures.

Morehouse et al. Pat. No. 3,085,908 shows the preparation of copolymers of gamma-aminopropylsilicone and phenylsilicone, and like materials. However, these are not shown to be capable of air-drying as protective coatings to produce cured coatings capable of withstanding high temperatures. In this particular case, the aminoalkoxylsilicones are copolymerized with the other silicones.

SUMMARY OF THE INVENTION

In accordance with the present invention, a polysiloxane protective coating cured by air-drying to a film having the heat resistant properties indicated above is prepared by the process of admixing 3–25 parts by weight of an aminosilane compound having the formula

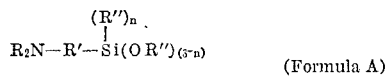

(Formula A)

with 100 parts of a polysiloxane prepolymer having at least 10 repeating units therein of the formula

(Formula B)

in which formulas R is selected from the class consisting of hydrogen, alkyl, cycloalkyl and aminoalkyl radicals; R' is a divalent hydrocarbon radical having at least 3 carbon atoms and having the valence bonds therein which are attached to the N and Si atoms of Formula A separated by at least 3 carbon atoms; R'' is a monovalent hydrocarbon radical having 1–6 carbon atoms; and $n$ is an integer having a value of 0–2. Preferably the polysiloxane has no more than about 60 repeating units of the given formula, and still particularly preferred is a polysiloxane having terminal hydroxy groups and having a molecular weight such as to give a viscosity at 25° C. of 100–275 when dissolved in toluene or xylene in a concentration of 50–60% solids.

Particularly preferred as the polysiloxane is one in which one R'' group represents methyl and the other represents phenyl. Particularly preferred as the amino-silane compounds are gamma-aminopropyltriethoxysilane and delta-aminobutylmethyldiethoxysilane.

The coating compositions of this invention may be modified by suitable pigmentation and other paint or coating expedients in the manner of other basic protective coatings to satisfy a variety of conventional coating needs. However, such components should not be organic materials or other materials which will decompose upon being subjected to heat as described above unless the particular composition is to be used for some purpose which will not involve exposure to such high temperatures.

The components described above are fixed in an inert solvent, such as xylene or toluene, preferably in a proportion as to produce a solution having approximately 50–60% by weight solids. Then the components are allowed to react in solution for a period of 30–60 minutes before the solution is applied as a coating on a solid substrate. The nature of the substrate is not critical and can be metal, glass, wood, plastic or any other material which can withstand the conditions to which the coating is to be subsequently subjected. Upon air-drying and curing the applied film at a temperature of about 20–40° C., a cured, insoluble coating is obtained capable of withstanding temperatures of 650° F. for extended periods.

Typical R groups that can be used in the above-described components include methyl, ethyl, propyl, amyl, hexyl, octyl, cyclohexyl, cyclohexylmethyl, cycloheptyl, methyl cyclohexyl, aminoethyl, aminopropyl, dimethylaminoethyl, diethylaminopropyl, etc.

Typical R' groups that can be used in the above formulas include the following divalent hydrocarbon radicals: trimethylene, 2,4-hexylene, n-amylene, octamethylene, p-phenylene, 1,4-cyclohexylene, methylene-p-phenylene, 4,4'-diphenylene, and the like. Advantageously the R and R' groups have no more than 12 carbon atoms, preferably no more than 6.

Typical monovalent hydrocarbon radicals represented by R'' include: methyl, ethyl, propyl, butyl, amyl, hexyl, phenyl, cycloheptyl, cyclohexyl, allyl, butenyl, pentenyl, hexenyl, vinyl, propargyl, etc.

In addition to xylene and toluene, various other hydrocarbons and chlorinated hydrocarbons can be used as the reaction and solvent media for producing the protective coatings of this invention. Such other solvents include benzene, cyclohexane, cycloheptane, hexane, octane, chlorobenzene, chlorotoluene, and the like.

Pigments and fillers that may be used in the protective coating compositions are advantageously those which can withstand high temperatures. Typical of these are titanium dioxide, zinc oxide, iron oxide, zinc chromate, magnesium silicate, aluminum powder, etc. The proportions of such materials are those normally used as pigments or fillers in coating compositions. Preferably, however, no more than one part of pigment is used per part of total resin component.

The proportions of aminosilane to be used will vary according to the properties desired in the coating composition. When it is desired to accelerate the drying time, higher proportions of the aminosilane can be used. However, the use of more than 25 parts of the aminosilane appears to give no added benefit, but instead increases the raw material costs. On the other hand, if less than 3 parts by weight of the aminosilane is used, the drying period becomes more prolonged so that at least 3 parts and preferably at least 10 parts of aminosilane are used per 100 parts of the polysiloxane.

The invention is best illustrated by the following examples. These examples are intended merely for illustrative purposes and are not to be regarded as limiting the scope of the invention nor the maner in which it may be practiced. Unless specifically indicated otherwise, parts and percentages are by weight.

EXAMPLE I

One hundred parts of a 50% xylene solution of polymethylphenylsiloxane having a viscosity in this solution of 150 centipoises at 25° C. is placed in a flask equipped with a stirrer. This solution containing 50% resin solids has a light straw color, a specific gravity of 1.01, a Gardner color of 1, and Gardner-Holdt color of T–H and weighs 8.4 pounds per gallon. To this is added a solution containing 10 parts of gamma-aminopropyltriethoxysilane and 57 parts of xylene. These are stirred until the two components are thoroughly mixed and then the solution is allowed to stand for 30 minutes at room temperature. This solution is applied as a coating on thin, flat sheets of steel and allowed to air-dry at room temperature. After 72 hours, the coating has hardened to a tough solvent-resistant material and upon testing is found to withstand temperatures up to 650° F. for more than 500 hours.

EXAMPLE II

The procedure of Example I is repeated except that 50 parts of a pigment are added prior to the addition of the aminosilane. Similar results are obtained with regard to air-drying and hardening, and the product has similar properties with regard to heat resistance.

EXAMPLE III

The procedure of Examples I and II are repeated using in place of the aminosilane of those examples, an equivalent amount of N-beta - aminoethyl - gamma - aminopropyl-trimethoxysilane. Similar results are obtained as in Examples I and II with respect to air-drying, hardening and heat resistance of the films.

EXAMPLE IV

The procedures of Examples I and II are repeated with similar results using in place of the aminosilane of those examples, an equivalent weight of delta-aminobutylmethyldiethoxysilane.

EXAMPLE V

The procedure of Example I is repeated except that 12.5 parts of titanium dioxide is added to the polymethylphenylsiloxane prior to the addition of the aminosilane. Similar results in air-drying, curing and heat resistance are obtained as in Example I.

EXAMPLE VI

The procedures of Examples I through V are repeated using in place of the polymethylphenylsiloxane of those examples, 100 parts of a toluene solution containing 60% polymethylphenylsiloxane having a molecular weight such that this solution has a viscosity of 225 centipoises at 25° C. This particular polymer solution has a straw color, a Gardner color of 6, a Gardner-Holdt color of E–H, a specific gravity of 1.04, and a density of 8.7 pounds per gallon. Similar results are obtained as in the prior examples so as to give an air-dried, tough coating, resistant to heating at 650° F. When these examples are repeated using polymer solutions of similar weight proportions but varying molecular weight so that in one case the viscosity at 25° C. is 175 and in another case 275, similar results are obtained upon air-drying to tough heat resistant coatings.

EXAMPLE VII

The procedure of Example I is repeated with similar results using polymethylphenylsiloxane polymers of different molecular weights, one that gives a viscosity at 25° C. of 100 centipoises, and another that gives a viscosity of 200 centipoises. Similar results are obtained as in Example I.

Similar results are obtained as in the preceding examples when other polysiloxanes having repeating units of Formula B are substituted for the polymethylphenylsiloxane such as polyethylphenylsiloxane, polymethylcyclohexylsiloxane, polymethylbutylsiloxane, polymethylethylsiloxane, polybutylphenylsiloxane, polydimethylsiloxane, polydiphenylsiloxane, polymethylhexylsiloxane, and the like.

Likewise other aminosilanes of Formula A, when substituted for the aminosilanes in the above examples, give similar results such as:

Aminopropyldiethylethoxysilane
Dimethylaminotriethoxysilane
Diethylaminodibutylphenoxysilane
Aminodipropylbutoxysilane
Ethylaminoethylaminobutyltributoxysilane
Aminophenylaminodibutylethoxysilane The coatings prepared according to the procedures described herein and illustrated by the foregoing examples can be exposed to temperatures as high as 700° F. for short periods and can withstand temperatures of 650° F. almost indefinitely. In addition the products of this invention have a number of other very desirable properties including good reflectance, retention of gloss 60°, good adhesion, good corrosion resistance, and also resistance to blistering, color change, chalking and cracking. For example a product of Example II, in which titanium dioxide is used as the pigment, withstands 50 hours exposure at 700° F., withstands temperatures of 600° F. indefinitely, and the reflectance after 100 hours exposure to 650° F. is 82% with a 60° gloss exceeding 80 units.

It is generally found that the higher the pigment loading the higher is the reflectance factor. However, the gloss retention is sometimes adversely affected by high pigmentation. In addition to the various pigments indicated above, zinc, calcium and strontium molybdates, magnesium carbonate and magnesium oxide are found to be particularly useful, giving excellent reflectance, excellent adhesion, color stability and corrosion resistance.

Various metal substrates can be used as well as materials other than metals, such as glass, wood, plastic, refractories, etc., provided they can withstand the conditions to which the protective coating is to be exposed. The substrate is first cleaned of dirt, grease and any oxide layer. This can be effected by first solvent cleaning with methylethylketone, then a treatment of alcoholic phosphoric acid for a very brief period, then rinsed in distilled water and dried by blowing with air. The coatings are advantageously applied by spray application, preferably to a film thickness of at least 1.0 mil, advantageously at least 1.5 mils wet film thickness. While films of considerable thickness can be applied effectively, the film thickness, in order to obtain a fast rate of air-drying, generally does not exceed 8 or 10 mils. With a wet film thickness of 1.5 mils, the films are generally air-dried sufficiently in 5 minutes to be set to touch, dust free in 7 minutes and tack free in 60 minutes.

In some cases a primer coating may be first applied to the metal or other surface after cleaning in order to give greater adhesion. In such cases the primer coating may be essentially the same polymer composition, but may vary in the amount or type of pigment contained therein.

These materials are found to have excellent reflectance even after exposure at 650° F. For example, a coating of Example III in which the pigment is titanium dioxide, after being air-dried for 72 hours, is exposed to a temperature of 650° F. With a reflectance of 94 prior to the 650° F. exposure, the reflectance after one hour exposure is an average of 83; after two hours, an average of 77; after 18 hours an average of 84; and after 100 hours an average of 88.5.

Films prepared according to this invention, when given weathering tests in the Florida sunshine, show excellent weathering ability over a 24 month period, particularly with regard to reflectance and retention of 60° gloss. Such tests are performed with excellent results on titanium, stainless steel, aluminum, carbon steel and aluminum clad aluminum alloy panels.

While certain features of this invention have been described in detail with respect ot the various embodiments thereof, it will, of course, be apparent that other modifications can be made within the spirit and scope of this invention and it is not intended to limit the invention to the exact details shown above except insofar as they are defined in the following claims:

The invention claimed is:
1. An ambient temperature cured coating composition produced by the process of admixing:
   (a) 3 to 25 parts by weight of an aminosilane curing agent having the formula

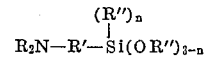

wherein R is selected from the class consisting of hydrogen, alkyl, cycloalkyl and aminoalkyl, R' is a divalent hydrocarbon radical having at least three carbon atoms and having the valence bonds therein which are attached to the N and Si atoms separated by at least 3 carbon atoms, R" is a monovalent hydrocarbon radical having 1 to 6 carbon atoms, $n$ is an integer of 0 to 2;
   (b) 100 parts of a polysiloxane prepolymer having at least 10 and no more than 60 repeating units of the formula

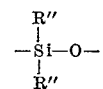

wherein R" is a monovalent hydrocarbon radical having 1 to 6 carbon atoms; and
   (c) a solvent selected from the group consisting of xylene, toluene, benzene, cyclohexane, cycloheptane, hexane, octane, chlorobenzene, and chlorotulene wherein said prepolymer comprises about 50 to 60 weight percent of said mixture and allowing said mixture to cure at room temperature.

2. An ambient temperature cured coating composition according to claim 1 wherein said mixture contains about 3 to 10 parts by weight of said amino-silane curing agent.

3. An ambient temperature cured coating composition according to claim 1 which also contains a pigment or filler slected from the group consisting of titanium dioxide, zinc oxide, iron oxide, zinc chromate, magnesium silicate, and aluminum powder.

4. An ambient temperature cured coating composition produced by the process of admixing:
   (a) a first component of about 50 parts by weight of xylene and 50 parts by weight of polymethylphenylsiloxane; and
   (b) a second component of about 10 parts by weight of gamma-aminopropyltriethoxysilane and about 57 parts by weight of xylene and allowing said mixture to cure at room temperature.

5. An ambient temperature cured coating composition according to claim 4 which also contains a pigment selected from the group consisting of titanium dioxide, zinc oxide, iron oxide, zinc molybdate, calcium molybdate, magnesium silicate, and aluminum powder.

6. An ambient temperature cured coating composition according to claim 4 wherein said second component is about 10 parts by weight of N-beta-aminoethyl-gamma-aminopropyltrimethoxysilane and about 57 parts by weight of xylene.

7. An ambient temperature cured coating composition according to claim 4 wherein said second component is about 10 parts by weight of delta-amino-butylmethyldiethoxysilane and about 57 parts by weight of xylene.

8. An ambient temperature cured coating composition according to claim 4 wherein about 12.5 parts by weight of titanium dioxide is added to said mixture.

9. An ambient temperature cured coating composition according to claim 4 wherein said first component contains about 40 parts by weight of toluene and about 60 parts by weight of polymethylphenylsiloxane.

References Cited

UNITED STATES PATENTS

| 2,921,950 | 1/1960 | Jex | 260—46.5 E |
| 3,247,281 | 4/1966 | Gagliardi | 260—46.5 E |
| 3,364,161 | 1/1968 | Nadler | 260—46.5 GX |

LEWIS T. JACOBS, Primary Examiner

U.S. Cl. X.R.

260—33.8 SB